US012533288B1

(12) United States Patent
Bao et al.

(10) Patent No.: US 12,533,288 B1
(45) Date of Patent: Jan. 27, 2026

(54) MASSAGER CAPABLE OF AUTOMATICALLY FITTING AND PRESSING

(71) Applicant: SHENZHEN S-HANDE TECHNOLOGY CO., LTD., Shenzhen (CN)

(72) Inventors: Zhenhao Bao, Shenzhen (CN); Jing He, Shenzhen (CN)

(73) Assignee: SHENZHEN S-HANDE TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 19/174,016

(22) Filed: Apr. 9, 2025

Related U.S. Application Data

(63) Continuation of application No. PCT/CN2025/078762, filed on Feb. 24, 2025.

(30) Foreign Application Priority Data

Jul. 24, 2024 (CN) ......................... 202411000103.8

(51) Int. Cl.
*A61H 23/02* (2006.01)
*A61H 7/00* (2006.01)
*A61H 19/00* (2006.01)

(52) U.S. Cl.
CPC ......... *A61H 23/0254* (2013.01); *A61H 7/005* (2013.01); *A61H 19/44* (2013.01); (Continued)

(58) Field of Classification Search
CPC ........ A61H 19/00; A61H 19/30; A61H 19/34; A61H 19/40; A61H 19/44; A61H 21/00; A61H 7/005; A61H 2201/0153
See application file for complete search history.

(56) References Cited

U.S. PATENT DOCUMENTS 11,771,619 B1 * 10/2023 Yan ........................ A61H 19/34 600/38
12,171,710 B1 * 12/2024 Huang .................. A61H 19/44
(Continued)

FOREIGN PATENT DOCUMENTS

CN 104367458 A 2/2015
CN 118267279 A 7/2024
(Continued)

OTHER PUBLICATIONS

International Search Report and Written Opinion issued in corresponding PCT Application No. PCT/CN2025/078762, dated Jun. 13, 2025.

*Primary Examiner* — Victoria Murphy
(74) *Attorney, Agent, or Firm* — Westbridge IP LLC

(57) ABSTRACT

A massager capable of automatically fitting and pressing includes a massager body and a flexible rubber sleeve. The massager body includes a handle assembly provided with a first connecting part and a second connecting part at one end, a first massage member connected to the first connecting part and a second massage member connected to the second connecting part through the first connecting member. When the second massage member moves relative to the first massage member, the first connecting member generates elastic deformation, so that the massager has a first state in which the second massage member and the first massage member are configured together to massage a first area of the body, and a second state in which the first massage member massages the first area of the body and the second massage member massages the second area of the body.

10 Claims, 6 Drawing Sheets

(52) U.S. Cl.
CPC ................ *A61H 2201/0107* (2013.01); *A61H 2201/0153* (2013.01); *A61H 2201/0192* (2013.01); *A61H 2201/1207* (2013.01)

(56) References Cited

U.S. PATENT DOCUMENTS

| | | | | |
|---|---|---|---|---|
| 2007/0142754 | A1* | 6/2007 | Nan | A61H 19/44 601/72 |
| 2011/0009691 | A1* | 1/2011 | Stevens | A61H 19/44 600/38 |
| 2012/0316390 | A1* | 12/2012 | Topolev | A61H 19/30 600/38 |
| 2014/0323929 | A1* | 10/2014 | Lurchenko | A61H 19/40 601/46 |
| 2015/0182413 | A1 | 7/2015 | Guang | |
| 2016/0120737 | A1* | 5/2016 | Sedic | A61H 23/0263 601/46 |
| 2016/0166466 | A1 | 6/2016 | Topolev | |
| 2018/0042809 | A1* | 2/2018 | Zipper | A61H 19/44 |
| 2018/0185237 | A1 | 7/2018 | Baetica et al. | |
| 2023/0096701 | A1* | 3/2023 | Sridhar | A61H 23/0218 600/38 |
| 2023/0346634 | A1* | 11/2023 | Wu | A61H 23/004 |
| 2024/0238155 | A1* | 7/2024 | Huang | A61H 23/0254 |

FOREIGN PATENT DOCUMENTS

| | | | | |
|---|---|---|---|---|
| CN | 118750354 A | | 10/2024 | |
| KR | 20170005752 | * | 4/2016 | A61H 19/00 |

* cited by examiner

MASSAGER CAPABLE OF AUTOMATICALLY FITTING AND PRESSING

CROSS-REFERENCE TO RELATED APPLICATIONS

This application is a continuation of International Application No. PCT/CN2025/078762, filed on Feb. 24, 2025, which claims priority to Chinese Patent Application No. 202411000103.8, filed on Jul. 24, 2024. The disclosures of the above-mentioned applications are incorporated herein by reference.

TECHNICAL FIELD

The present application relates to the technical field of massage devices, and in particular to a massager capable of automatically fitting and pressing.

BACKGROUND

Massagers generally work by applying pressure to the skin and muscle tissue of the human body through vibrating, patting, etc. At present, female massagers on the market are usually in the shape of a rod with a vibration motor at the front end, and an auxiliary massage part extending forward is arranged in the middle of the rod. The auxiliary massage part is also provided with a vibration motor inside. However, the two massage structures of the massager of this structure are located at different positions. During massage, the auxiliary massage part moves with the rod, and the single function leads to unsatisfactory massage effect.

SUMMARY

The main purpose of the present application is to propose a massager capable of automatically fitting and pressing, aiming to improve the problem that existing massagers have a single function and unsatisfactory massage effect.

To achieve the above purpose, the massager capable of automatically fitting and pressing in the present application includes a massager body and a flexible rubber sleeve sleeved outside the massager body, and the massager body includes:

- a handle assembly provided with a first end and a second end opposite to the first end along a length direction of the handle assembly, the first end is provided with a first connecting part and a second connecting part;
- a first massage member connected to the first connecting part;
- a second massage member connected to the second connecting part through a first connecting member;
- the first connecting member is elastic to allow the second massage member to be closer to or away from the first massage member, and a distance from an end of the first massage member away from the handle assembly to the second end is greater than a distance from an end of the second massage member away from the handle assembly to the second end;
- the first connecting member is elastically deformed under force to make the massager capable of automatically fitting and pressing have a first state and a second state;
- in the first state, the second massage member is arranged close to the first massage member, and the first massage member and the second massage member are configured together to massage a first area of a body; and
- in the second state, the second massage member is arranged away from the first massage member; the first massage member is configured to massage the first area of the body, and the second massage member is configured to massage a second area of the body.

In an embodiment, the first connecting member is an elastic metal member, and the second massage member is in an initial position relative to the first massage member in a natural state; the first connecting member is configured to bend arbitrarily and produce elastic deformation when the second massage member moves, and a rebound force generated by the elastic deformation of the first connecting member is configured to drive the second massage member to return to the initial position.

In an embodiment, the second massage member includes a mounting member and one or more first vibration motors, and the one or more first vibration motors are provided on the mounting member; one end of the first connecting member is connected to the second connecting part of the handle assembly, and the other end of the first connecting member is connected to the mounting member.

In an embodiment, the first connecting member is a spring; a first inserting slot is provided at one end of the mounting member, and a second inserting slot is provided at the other end of the mounting member; an end of the first connecting member away from the handle assembly is inserted into the first inserting slot, and the one or more first vibration motors are inserted into the second inserting slot.

In an embodiment, the massager body further includes a second connecting member; the handle assembly includes a first housing, and the first connecting part and the second connecting part are provided at one end of the first housing; the first massage member includes a second housing and one or more second vibration motors provided in the second housing, the one or more second vibration motors are provided in the second housing, and the first connecting member is made of soft rubber; one end of the first connecting member is connected to the first housing, and the other end of the first connecting member is connected to the second housing.

In an embodiment, an outer surface of one end of the second connecting member close to the first housing is provided with a first clamping slot; a first inserting hole with a shape matching the second connecting member is formed in the first connecting part, and a first clamping portion is provided to protrude from an inner wall of the first inserting hole corresponding to the first clamping slot; and an outer surface of one end of the second connecting member close to the second housing is provided with a second clamping slot; a second inserting hole with a shape matching the second connecting member is formed on the second housing, and a second clamping portion is provided to protrude from an inner wall of the second inserting hole corresponding to the second clamping slot.

In an embodiment, an outer surface of the second connecting member provided in the first inserting hole is provided with a first limiting hole, and a first limiting column is provided to protrude from an inner wall surface of the first inserting hole; the first limiting column is inserted into the first limiting hole, to connect the second connecting member and the first housing in a limiting manner; and

- an outer surface of the second connecting member provided in the second inserting hole is provided with a second limiting hole; a second limiting column is provided to protrude from an inner wall surface of the second inserting hole, and the second limiting column is inserted into the second limiting hole, to connect the second connecting member and the second housing in a limiting manner.

In an embodiment, the first housing and the second connecting member are an integral structure.

In an embodiment, the second housing and the second connecting member are an integral structure.

In an embodiment, the second connecting member, the first housing and the second housing are an integral structure.

In an embodiment, the handle assembly further includes a circuit board, a magnetic charging board and a battery; the circuit board, the magnetic charging board and the battery are provided in the first housing, and the battery is electrically connected to the circuit board, the magnetic charging board, the one or more first vibration motors and the one or more second vibration motors.

In an embodiment, the massager body further includes a first wiring, and the first connecting member is provided with a first wiring channel along a length direction of the first connecting member; one end of the first wiring is connected to the circuit board, and the other end of the first wiring passes through the first wiring channel to connect to the one or more first vibration motors.

In an embodiment, the massager body further includes a second wiring, and the second connecting member is provided with a second wiring channel along a length direction of the second connecting member; one end of the second wiring is connected to the circuit board, and the other end of the second wiring passes through the second wiring channel to connect to the one or more second vibration motors.

In the technical solution of the present application, a handle assembly is configured to connect the first massage member with the second massage member, which is used to massage the first area and the second area of the body. The massager capable of automatically fitting and pressing includes a massager body and a flexible rubber sleeve sleeved outside the massager body. The massager body includes a handle assembly, a first massage member and a second massage member. One end of the handle assembly is provided with a first connecting part and a second connecting part. The first massage member is connected to the first connecting part, and the second massage member is connected to the second connecting part through the first connecting member with elasticity, so that the second massage member can be close to or away from the first massage member. When the second massage member moves relative to the first massage member, the first connecting member generates elastic deformation. The state when the second massage member is close to the first massage member is referred to as the first state, and the second massage member and the first massage member are configured together to massage the first area of the body. The state when the second massage member is away from the first massage member is referred to as the second state, the first massage member is used to massage the first area of the body, and the second massage member is used to massage the second area of the body.

Since the first connecting member is an elastic structure, in the first state, the first massage member and the second massage member are close to each other and act together on the first area of the body to achieve double-end in-body massage. In the second state, the first massage member and the second massage member are away from each other to form a bifurcated structure. The first massage member enters the body to massage the first area of the body, and the second massage member is away from the first massage member and is located outside the body, so that the first connecting member is bent to produce elastic deformation. Under the action of the rebound force of the first connecting member, the second massage member continues to squeeze and massage the second area of the body, and cooperates with the first massage member to form a double-end clamping structure, which helps to improve the massage effect. Furthermore, the elasticity of the first connecting member can be utilized to control the second massage member to move away from the second area of the body and then release it, so that the first connecting member drives the second massage member to return to its original position and tap the second area of the body, thereby further improving the massage experience. Therefore, the massager capable of automatically fitting and pressing provided by the present application has multiple massage modes, increases operability and has better massage effects, and effectively improves the existing massager with single function and poor massage experience.

BRIEF DESCRIPTION OF THE DRAWINGS

In order to more clearly describe the technical solutions in the embodiments of the present application or the related art, accompanying drawings required in the description of the embodiments or the related art will be briefly introduced below. Obviously, the accompanying drawings described below are only some embodiments of the present application. For those skilled in the art, other drawings can be obtained based on the structures shown in these drawings without creative efforts.

The realization of the purpose, functional features and advantages of the present application will be further explained in conjunction with embodiments and with reference to the accompanying drawings.

DETAILED DESCRIPTION OF THE EMBODIMENTS

The technical solutions in the embodiments of the present application will be described clearly and completely below in conjunction with the accompanying drawings. Obviously, the described embodiments are only some rather than all of the embodiments of the present application. Based on the embodiments in the present application, all other embodiments obtained by those skilled in the art without creative efforts are within the scope of the present application.

It should be noted that if the embodiments of the present application involve directional indications (such as up, down, left, right, front, back . . . ), the directional indications are only used to explain the relative position relationship, movement status, etc. between the members in a certain specific posture. If the specific posture changes, the directional indications will also change accordingly.

In addition, if there are descriptions involving "first", "second", etc. in the embodiments of the present application, the descriptions of "first", "second", etc. are only used for descriptive purposes and cannot be understood as indicating or suggesting their relative importance or implicitly indicating the number of technical features indicated. Therefore, the features defined as "first" and "second" can explicitly or implicitly include at least one of the features. In addition, if "and/or" appears in the full text, its meaning includes three parallel schemes. Taking "A and/or B" as an example, it includes scheme A, or scheme B, or a scheme that satisfies both A and B. In addition, the technical solutions between the various embodiments can be combined with each other, but they must be based on the fact that they can be implemented by those skilled in the art. When the combination of technical solutions is contradictory or cannot be implemented, it should be deemed that such combination of technical solutions does not exist and is not within the scope of the present application.

The present application proposes a massager capable of automatically fitting and pressing.

Figure 6:
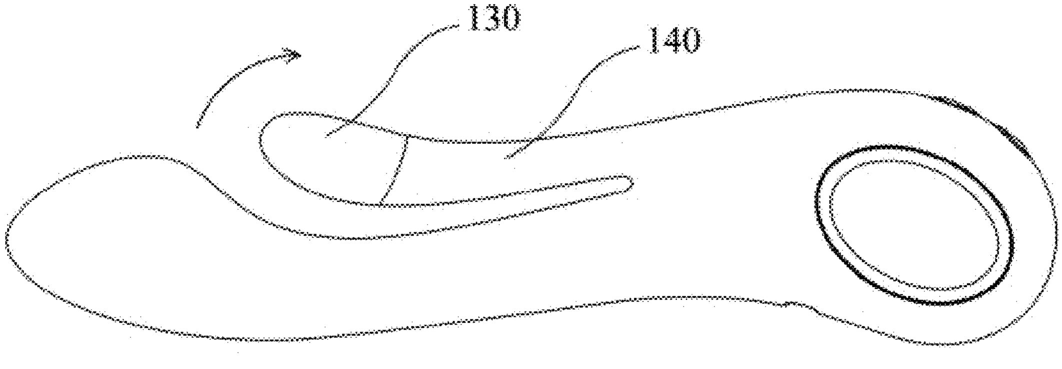
FIG. 6 is a schematic diagram of the massager capable of automatically fitting and pressing according to the present application in a first state.
Figure 7:
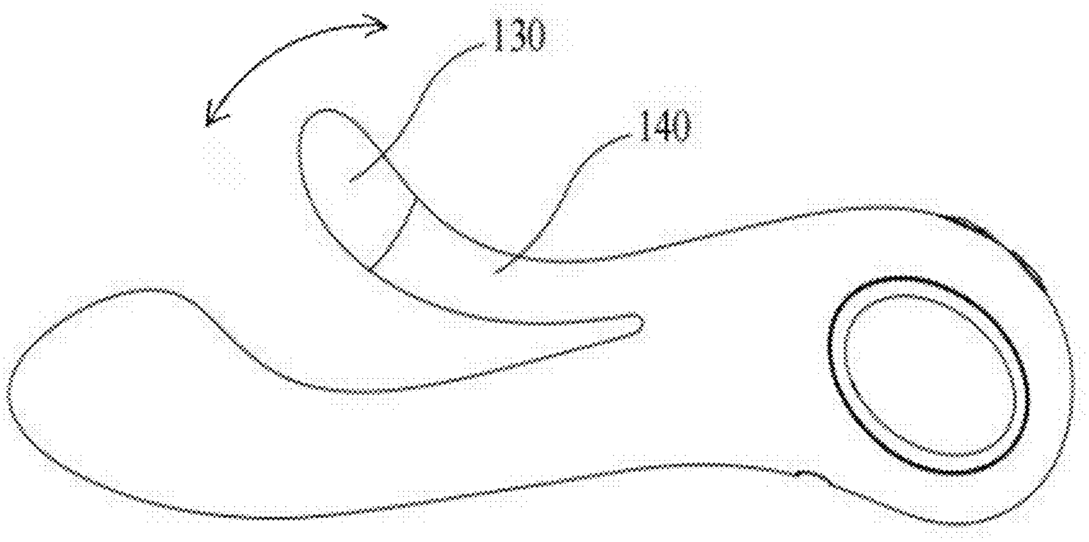
FIG. 7 is a schematic diagram of the massager capable of automatically fitting and pressing according to the present application in a third state.
Figure 8:
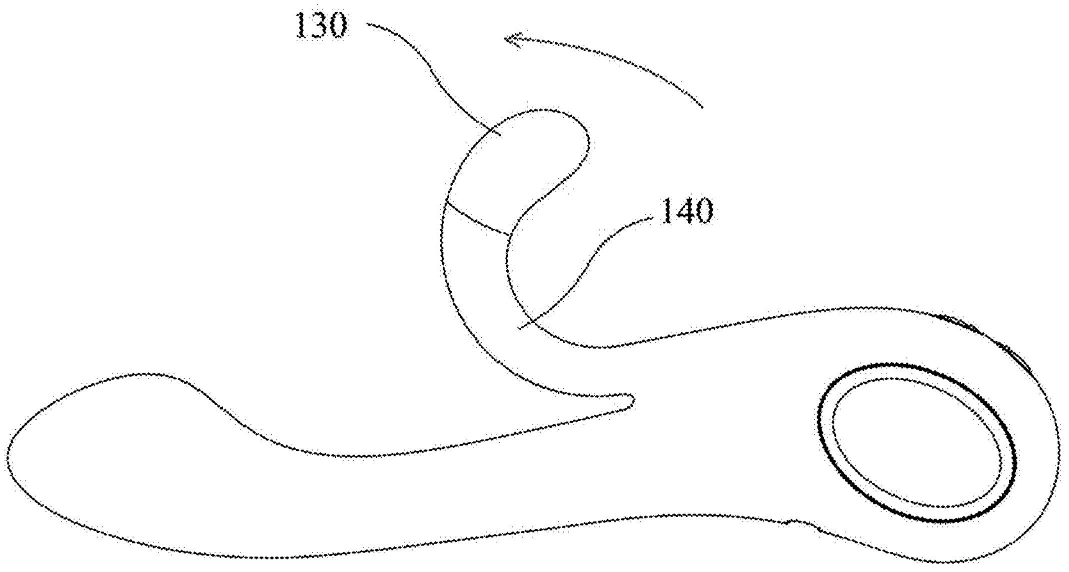
FIG. 8 is a schematic diagram of the massager capable of automatically fitting and pressing according to the present application in a second state.

Referring to FIGS. 1 to 3 and FIGS. 6 to 8, in an embodiment of the present application, the massager 10 capable of automatically fitting and pressing includes a massager body 100 and a flexible rubber sleeve 200 sleeved on the outside of the massager body 100. The massager body 100 includes a handle assembly 110, a first massage member 120 and a second massage member 130. The handle assembly 110 is provided with a first end 110*b* and a second end 110*c* opposite to the first end 110*b* along a length direction of the handle assembly 110. The first end 110*b* is provided with a first connecting part 111 and a second connecting part 112. The first massage member 120 is connected to the first connecting part 111, and the second massage member 130 is connected to the second connecting part 112 through a first connecting member 140 with elasticity, so that the second massage member 130 can be close to or away from the first massage member 120. When the second massage member 130 moves relative to the first massage member 120, the first connecting member 140 generates elastic deformation. As shown in FIG. 6, the state when the second massage member 130 is close to the first massage member 120 is referred to as a first state. The second massage member 130 and the first massage member 120 are configured together to massage a first area of the body. As shown in FIG. 8, the state when the second massage member 130 is away from the first massage member 120 is referred to as a second state. The first massage member 120 is used to massage the first area of the body, and the second massage member 130 is used to massage a second area of the body. As shown in FIG. 7, when the state of the second massage member 130 and the first connecting member 140 is located between the first state and the second state, it is a third state of the massager 10 capable of automatic fitting and pressing. During use, the second massage member 130 and the first connecting member 140 of the massager 10 capable of automatic fitting and pressing can change among the first state, the second state and the third state.

Since the first connecting member 140 is an elastic structure, in the first state, the first massage member 120 and the second massage member 130 are close to each other and act together on the first area of the body to achieve double-end in-body massage. In the second state, the first massage member 120 and the second massage member 130 are away from each other to form a bifurcated structure. The first massage member 120 enters the body to massage the first area of the body, and the second massage member 130 is away from the first massage member 120 and is located outside the body, so that the first connecting member 140 is bent to produce elastic deformation. Under the action of the rebound force of the first connecting member 140, the second massage member 130 continues to squeeze and massage the second area of the body, and cooperates with the first massage member 120 to form a double-end clamping structure, which helps to improve the massage effect.

In an embodiment, the elasticity of the first connecting member 140 can also be utilized to control the second massage member 130 to be away from the second area of the body and then released, so that the first connecting member 140 drives the second massage member 130 to return to its original position to tap the second area of the body, thereby further improving the massage experience. Therefore, the massager 10 capable of automatically fitting and pressing provided by the present application has multiple massage methods, increases operability and has better massage effects, and effectively improves the problem of the existing massagers having a single function and poor massage experience.

In an embodiment, a distance between one end of the first massage member 120 away from the handle assembly 110 and the second end 110*c* is greater than the distance between one end of the second massage member 130 away from the handle assembly 110 and the second end 110*c*, that is, the first massage member 120 and the second massage member 130 are staggered and have different lengths, so that the first massage member 120 fits the first area of the body while the second massage member 130 can accurately massage the second area.

In this embodiment, the flexible rubber sleeve 200 is made of silicone, which is coated on the outer surface of the massager body 100 and is used to contact with human skin to increase the softness of massage. The silicone has good deformation ability to avoid hindering the bending deformation of the first connecting member 140 when the second massage member 130 moves, so that the bending angle and direction of the first connecting member 140 are more flexible. In some other embodiments of the present application, the material of the flexible rubber sleeve 200 is not specifically limited.

In an embodiment, the first connecting member 140 is an elastic metal member. In a natural state, the second massage member 130 is in an initial position relative to the first massage member 120. The first connecting member 140 is used to bend arbitrarily and generate elastic deformation when the second massage member 130 moves. The rebound force generated by the elastic deformation of the first connecting member 140 is used to drive the second massage member 130 to return to its initial position.

Figure 1:
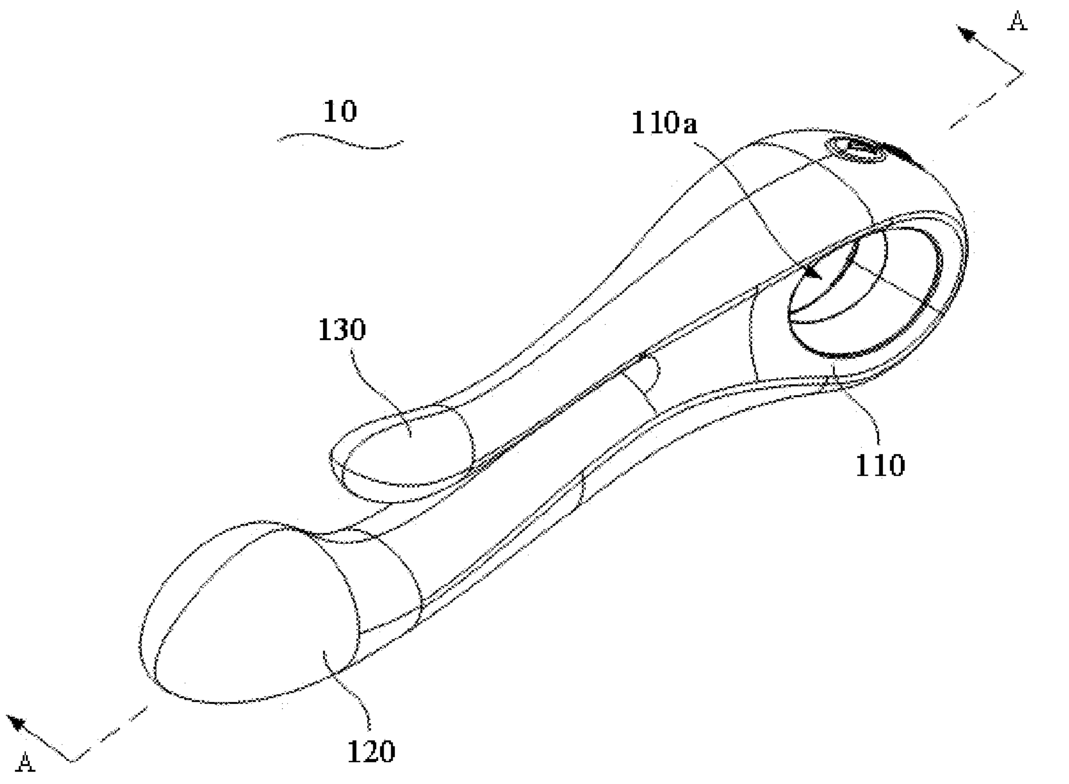
FIG. 1 is a schematic structural diagram of a massager capable of automatically fitting and pressing according to an embodiment of the present application.

As shown in FIG. 1 and FIG. 7, in an embodiment of the present application, in order to realize the continuous fitting massage function of the second massage member 130 in the second state, the first connecting member 140 is an elastic metal member. When the massager 10 capable of automatically fitting and pressing is in a natural state when not in use, the second massage member 130 and the first massage member 120 extend in the same direction, and the second massage member 130 is in the initial position relative to the first massage member 120, so that there is a gap between the two. In the first state, the first massage member 120 and the second massage member 130 are both located in the first area of the body, the second massage member 130 is pressed against the surface of the first massage member 120, and the first connecting member 140 produces a slight elastic deformation. When the massager 10 capable of automatically fitting and pressing leaves the first area of the body, the first connecting member 140 rebounds and drives the first massage member 120 to reset.

In the second state, the first massage member 120 acts on the first area of the body, and the second massage member 130 moves away from the first massage member 120 and acts on the second area of the body. At this time, the first connecting member 140 is bent to a large extent. During the movement of the massager 10 capable of automatically fitting and pressing, the rebound force of the first connecting member 140 enables the second massage member 130 to continuously squeeze and massage the second area of the body. When the massager 10 capable of automatically fitting and pressing leaves the first area and the second area of the body, the first connecting member 140 rebounds and drives the first massage member 120 to return to its initial position.

In an embodiment, the first connecting member 140 can be made of metal parts such as springs, elastic metal wires or elastic metal pieces, so that the second massage member 130 can move freely in any direction. The bending angle of the first connecting member 140 changes as the second massage member 130 moves in different directions and distances. The resilience of the first connecting member 140 can ensure that the second massage member 130 returns to its initial position after moving in any direction, thereby meeting the user's needs for different massage methods of the massager 10 capable of automatically fitting and pressing. The specific structure of the first connecting member 140 is not specifically limited here and can be selected according to actual needs.

In an embodiment, the second massage member 130 includes a mounting member 131 and one or more first vibration motors 132. The one or more first vibration motors 132 are arranged on the mounting member 131, one end of the first connecting member 140 is connected to the second connecting part 112 of the handle assembly 110, and the other end of the first connecting member 140 is connected to the mounting member 131.

Figure 2:
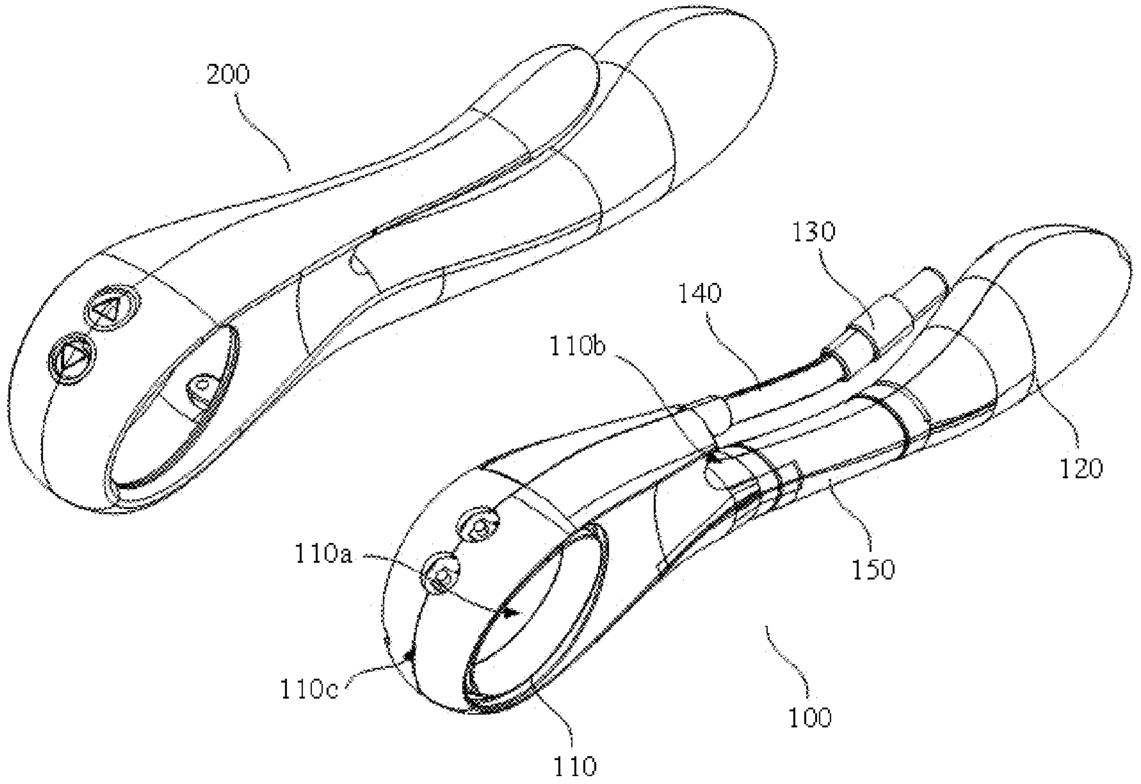
FIG. 2 is an exploded structural diagram of a massager body and a flexible rubber sleeve in the massager capable of automatically fitting and pressing according to an embodiment of the present application.
Figure 3:
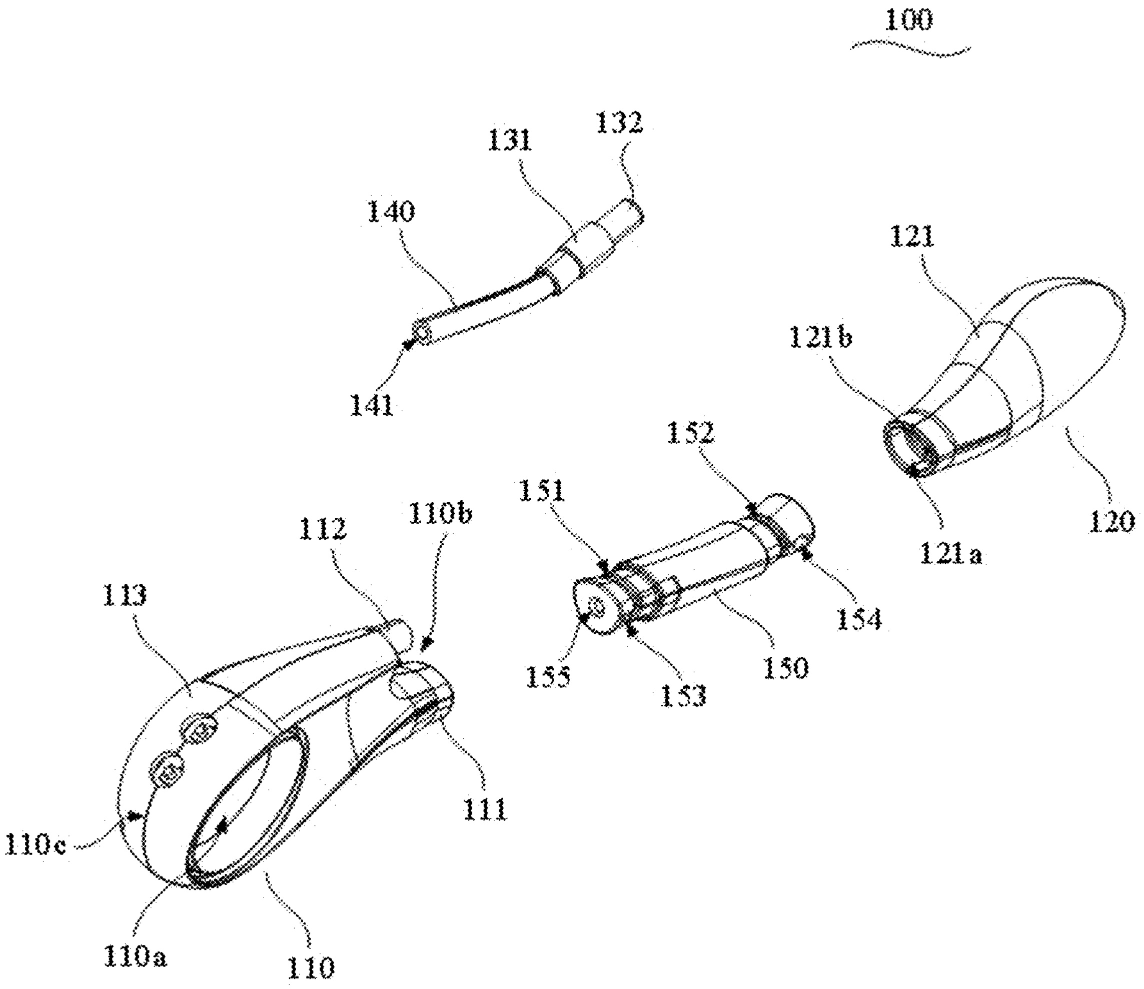
FIG. 3 is an exploded structural diagram of the massager body in the massager capable of automatically fitting and pressing according to an embodiment of the present application.
Figure 4:
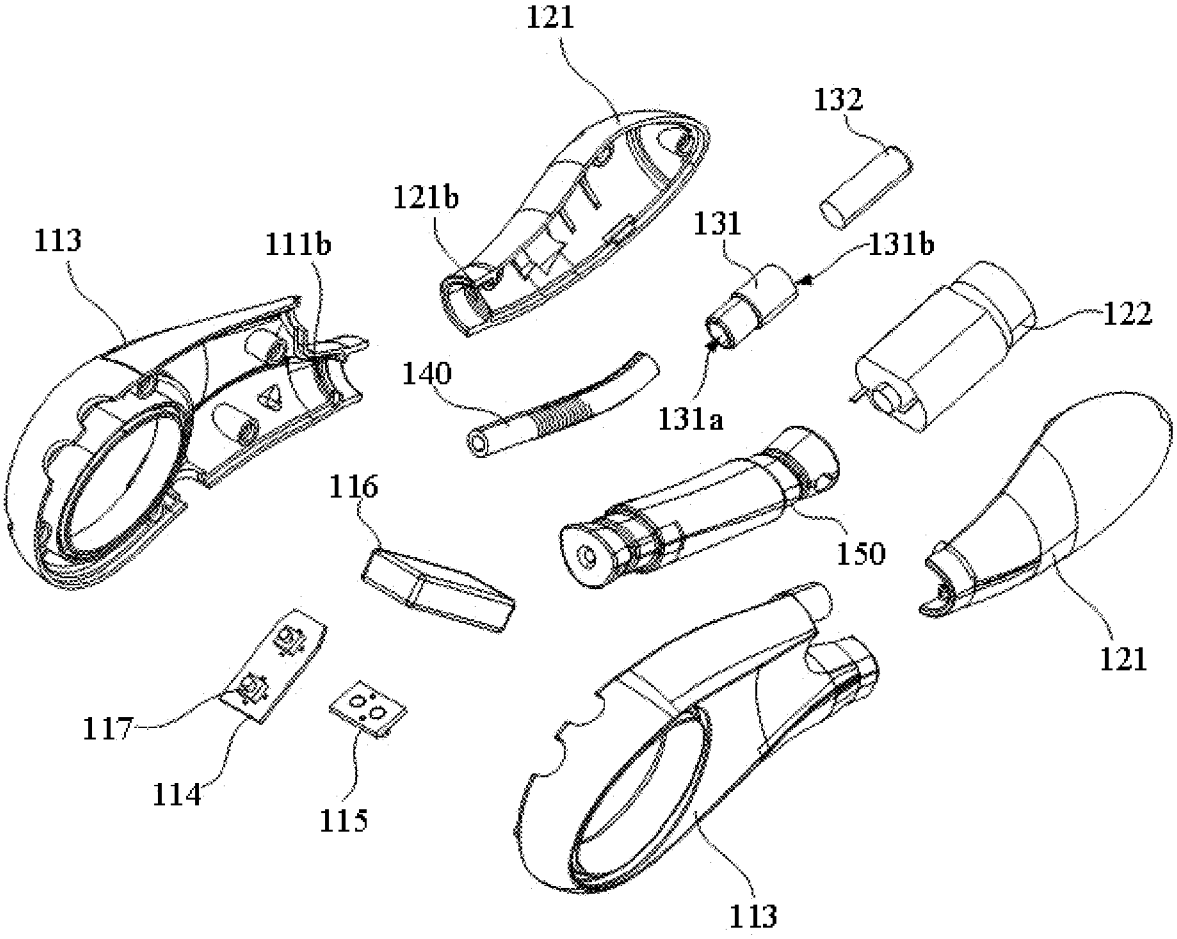
FIG. 4 is an exploded structural diagram of the massager body in FIG. 3.

As shown in FIG. 2 to FIG. 4, in order to enhance the massage experience of the massager 10 capable of automatically fitting and pressing, in an embodiment of the present application, the second massage member 130 includes a mounting member 131 and one or more first vibration motors 132. In an embodiment, one end of the first connecting member 140 is connected to the second connecting part 112 of the handle assembly 110, and the other end of the first connecting member 140 is connected to the mounting member 131. The one or more first vibration motors 132 are provided on the mounting member 131. The end of the first connecting member 140 away from the handle assembly 110 extends toward the direction close to the end of the first massage member 120. The overall length of the second massage member 130, the mounting member 131 and the one or more first vibration motors 132 is less than the length of the first massage member 120. This can enhance the adaptability of the first massage member 120 and the second massage member 130 to the first area and the second area of the body, respectively. Further referring to FIG. 5, the shape of the first massage member 120 is suitable for the second massage member 130 to abut against, which is convenient for both ends to enter the body. The one or more first vibration motors 132 transmit vibration through the flexible rubber sleeve 200 sleeved on the outside, thereby achieving the effect of active massage.

In the above embodiment, one first vibration motor 132 is provided. In order to enhance the vibration sensation, in some other embodiments of the present application, a plurality of first vibration motors 132 can be provided. The specific number can be set according to actual needs and is not limited here.

In an embodiment, the first connecting member 140 is a spring, and two ends of the mounting member 131 are respectively provided with a first inserting slot 131*a* and a second inserting slot 131*b*. The end of the first connecting member 140 away from the handle assembly 110 is inserted into the first inserting slot 131*a*, and the one or more first vibration motors 132 are inserted into the second inserting slot 131*b*.

Figure 5:
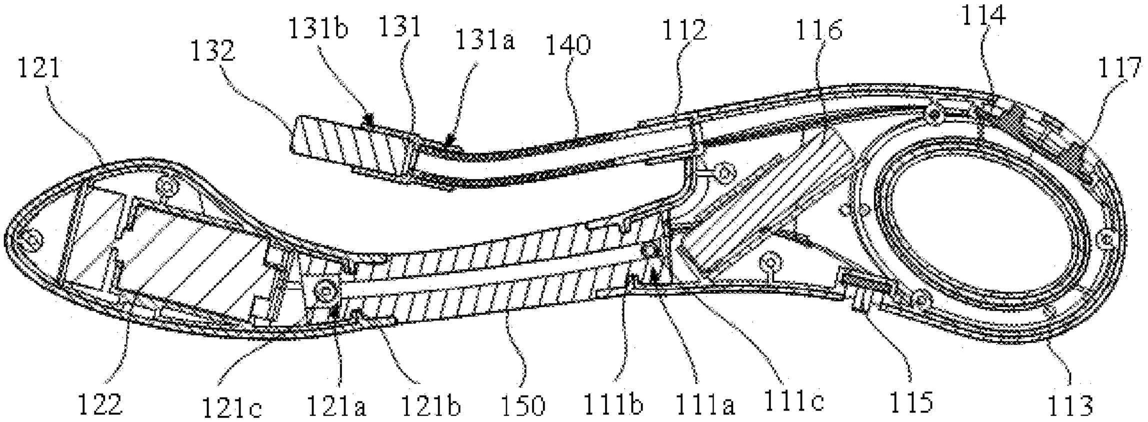
FIG. 5 is a cross-sectional view taken along the A-A direction of FIG. 1.

As shown in FIG. 3 to FIG. 5, in an embodiment of the present application, the first connecting member 140 is a coil spring structure. In an embodiment, a circular groove is provided in the second connecting part 112 on the handle assembly 110, and one end of the first connecting member 140 is inserted into the circular groove. The mounting member 131 is cylindrical and is provided with a first inserting slot 131*a* and a second inserting slot 131*b* at both ends. The end of the first connecting member 140 away from the handle assembly 110 is inserted into the first inserting slot 131*a*. The one or more first vibration motors 132 are cylindrical and inserted into the second inserting slot 131*b*. The ends of the one or more first vibration motors 132 away from the first connecting member 140 extend out of the first inserting slot 131*a*, to better transmit vibration through the flexible rubber sleeve 200. The first connecting member 140 is a coil spring with good resilience and can be bent arbitrarily to restore to its initial state. In addition, a layer of colloid can be coated around the surface of the spring. The colloid layer can provide additional buffering and shock absorption effects, making the movement smoother, reducing noise and partially offsetting the vibration transmitted from the first vibration motor 132. The colloid layer can effectively isolate the spring from external environments such as moisture and water, and is not easy to deform and rust.

The inner walls of the first inserting slot 131*a* and the second inserting slot 131*b* can be provided with protrusions for respectively abutting against the one or more first vibration motors 132 and the first connecting member 140 to increase friction and prevent falling off. In an embodiment, the first inserting slot 131*a* and the second inserting slot 131*b* can also be filled with adhesive to fix the one or more first vibration motors 132 and the first connecting member 140. Therefore, the one or more first vibration motors 132 are connected to the first connecting member 140 through the mounting member 131, which facilitates the assembly of the massager 10 capable of automatically fitting and pressing, and simplifies the product structure.

In an embodiment, the massager body 100 further includes a second connecting member 150, and the handle assembly 110 includes a first housing 113. The first connecting part 111 and the second connecting part 112 are provided at one end of the first housing 113. The first massage member 120 includes a second housing 121 and one or more second vibration motors 122, and the one or more second vibration motors 122 are arranged in the second housing 121. The first connecting member 140 is made of soft rubber and its two ends are respectively connected to the first housing 113 and the second housing 121.

As shown in FIG. 3 to FIG. 5, in an embodiment of the present application, the massager body 100 further includes a second connecting member 150, and the handle assembly 110 includes a first housing 113. The first housing 113 is hollow inside and is provided with a first connecting part 111 and a second connecting part 112 at the same end. The first massage member 120 includes a second housing 121 and the one or more second vibration motors 122, the second housing 121 is hollow inside and the one or more second vibration motors 122 are arranged in the second housing 121. One end of the second connecting member 150 is connected to the first connecting part 111 of the first housing 113, and the other end of the second connecting member 150 is connected to the second housing 121.

The second connecting member 150 is made of soft rubber. The second connecting member 150 made of soft rubber allows the first massage member 120 to be bent relative to the handle assembly 110. When the user operates the handle assembly 110 and applies the first massage member 120 to the first area of the body, the second connecting member 150 is bent appropriately to buffer the force applied by the handle assembly 110, thereby enhancing comfort. In the first state, the first massage member 120 and the second massage member 130 can form an in-body dual-vibration structure. In the second state, the first area and the second area of the body are massaged by two vibration motors respectively, so that the massager 10 capable of automatically fitting and pressing has diversified functions and better massage effects. In this embodiment, the second connecting member 150 is made of silicone, which is not limited in other embodiments of the present application.

In the above embodiment, one second vibration motor 122 is provided. In order to enhance the vibration sensation, in some other embodiments of the present application, a plurality of second vibration motors 122 can be provided. The specific number can be set according to actual needs and is not limited here.

In an embodiment, a through hole 110*a* is further formed on the handle assembly 110, and the through hole 110*a* is arranged at one end of the first housing 113 away from the second connecting member 150. When the user uses the massager 10 capable of automatically fitting and pressing, the fingers can hold the handle assembly 110 through the through hole 110*a*, which is convenient for the user to operate. The through hole 110*a* can reflect the overall design and aesthetics of the product.

In an embodiment, a first clamping slot 151 is provided on the outer surface of one end of the second connecting member 150 close to the first housing 113, and a first inserting hole 111*a* whose shape matches the second connecting member 150 is formed in the first connecting part 111. A first clamping portion 111*b* is protruded from the inner wall of the first inserting hole 111*a* corresponding to the first clamping slot 151; and/or, a second clamping slot 152 is provided on the outer surface of one end of the second connecting member 150 close to the second housing 121. A second inserting hole 121*a* whose shape matches the second connecting member 150 is formed on the second housing 121, and a second clamping portion 121*b* is protruded from the inner wall of the second inserting hole 121*a* corresponding to the second clamping slot 152.

As shown in FIG. 3 to FIG. 5, in an embodiment of the present application, the outer surface of one end of the second connecting member 150 close to the first housing 113 is recessed inward to form the first clamping slot 151, and the first clamping slot 151 is arranged in a ring shape around the circumference of the second connecting member 150. The first connecting part 111 of the first housing 113 forms a first inserting hole 111*a*, and the shape of the first inserting hole 111*a* matches the shape of the end of the second connecting member 150. An annular first clamping portion 111*b* is provided on the inner wall of the first inserting hole 111*a*. The second connecting member 150 is inserted into the first inserting hole 111*a*, and the first clamping portion 111*b* is embedded in the first clamping slot 151 to connect the second connecting member 150 to the first housing 113.

In an embodiment, the outer surface of one end of the second connecting member 150 away from the first housing 113 is inwardly recessed to form a second clamping slot 152, and the second clamping slot 152 is arranged in an annular shape around the circumference of the second connecting member 150. The second housing 121 is formed with a second inserting hole 121*a* matching the shape of the end of the second connecting member 150, and the inner wall of the second inserting hole 121*a* is provided with an annular second clamping portion 121*b*. The second connecting member 150 is inserted into the second inserting hole 121*a*, and the second clamping portion 121*b* is embedded in the second clamping slot 152 to connect the second connecting member 150 to the second housing 121. Therefore, the clamping slot and the clamping portion cooperate to prevent the second connecting member 150 from being separated from the first housing 113 and/or the second housing 121, so that the second connecting member 150 can ensure the connection stability under the premise of having the ability to deform.

In an embodiment, a first limiting hole 153 is formed on the outer surface of the second connecting member 150 disposed in the first inserting hole 111*a*, and a first limiting column 111*c* is provided to protrude from the inner wall surface of the first inserting hole 111*a*. The first limiting column 111*c* is inserted into the first limiting hole 153 to connect the second connecting member 150 and the first housing 113 in a limiting manner. And/or, a second limiting hole 154 is formed on the outer surface of the second connecting member 150 disposed in the second inserting hole 121*a*, and a second limiting column 121*c* is provided to protrude from the inner wall surface of the second inserting hole 121*a*. The second limiting column 121*c* is inserted into the second limiting hole 154 to connect the second connecting member 150 and the second housing 121 in a limiting manner.

As shown in FIG. 3 to FIG. 5, in an embodiment, in order to prevent the second connecting member 150 from being separated from the first housing 113 and/or the second housing 121, in an embodiment of the present application, a first limiting hole 153 is provided on the end surface of the second connecting member 150 extending into the first inserting hole 111*a*, and a first limiting column 111*c* with a shape matching the first limiting hole 153 is provided to protrude from the inner wall surface of the first inserting hole 111*a*. The first limiting column 111*c* is spaced apart from the first clamping portion 111*b*. When the second connecting member 150 is inserted into the first inserting hole 111*a*, the first limiting column 111*c* is provided in the first limiting hole 153 and abuts against its inner wall surface, thereby preventing the end of the second connecting member 150 from being separated from the first inserting hole 111*a* when subjected to tension.

The second connecting member 150 extending into the second inserting hole 121*a* is also provided with a second limiting hole 154 on its end surface, and a second limiting column 121*c*, which is shaped to match the second limiting hole 154, is provided to protrude from the inner wall surface of the second inserting hole 121*a*. The second limiting column 121*c* is spaced apart from the second clamping portion 121*b*. When the second connecting member 150 is inserted into the second inserting hole 121*a*, the second limiting column 121*c* is provided in the second limiting hole 154 and abuts against the inner wall surface thereof, thereby preventing the end of the second connecting member 150 from being separated from the second inserting hole 121*a* when subjected to tension. Therefore, by providing the limiting column and the limiting hole to cooperate with each other for limitation, the first housing 113 and the second connecting member 150, and the second housing 121 and the second connecting member 150 can be prevented from being separated from each other, thereby improving the stability of the product structure.

In an embodiment, the first housing 113 and the second connecting member 150 are an integral structure; the second housing 121 and the second connecting member 150 are an integral structure; or the second connecting member 150, the first housing 113 and the second housing 121 are an integral structure.

In an embodiment of the present application, the first housing 113 and the second connecting member 150 can be configured as an integral structure, and the second housing 121 and the second connecting member 150 are detachably connected. Alternatively, the second housing 121 and the second connecting member 150 are an integral structure, and the second housing 121 is detachably connected to the first housing 113 through the second connecting member 150. The detachable connection structure has the advantages of convenient product assembly, production, maintenance and parts replacement. Alternatively, the first housing 113, the second connecting member 150, and the second housing 121 are an integral structure to enhance the degree of integration of the massager 10 capable of automatically fitting and pressing, making the appearance more concise and beautiful. The specific structure is not limited here and can be designed according to actual needs.

In an embodiment, the handle assembly 110 also includes a circuit board 114, a magnetic charging board 115 and a battery 116. The circuit board 114, the magnetic charging board 115 and the battery 116 are provided in the first housing 113. The battery 116 is electrically connected to the circuit board 114, the magnetic charging board 115, the one or more first vibration motors 132 and the one or more second vibration motors 122.

As shown in FIG. 3 to FIG. 5, in an embodiment of the present application, the handle assembly 110 also includes a circuit board 114, a magnetic charging board 115 and a battery 116. In an embodiment, the circuit board 114, the magnetic charging board 115 and the battery 116 are all installed in the first housing 113. The circuit board 114 is provided with a controller. The battery 116 is electrically connected to the circuit board 114, the magnetic charging board 115, the one or more first vibration motors 132 and the one or more second vibration motors 122 through wiring. Two contacts are provided on the magnetic charging board 115. The two contacts are provided on the outer surface of the massager 10 capable of automatically fitting and pressing for connecting a magnetic charger to charge the battery 116. A controller and a control button 117 are also provided on the circuit board 114. A through hole is provided on the first housing 113. The control button 117 is provided at the through hole corresponding to the flexible rubber sleeve 200. The user can press the flexible rubber sleeve 200 to enter the through hole and trigger the control button 117 on the circuit board 114. The controller receives the electrical signal of the control button 117 to turn on or off the massager 10 capable of automatically fitting and pressing, or adjust the vibration intensity of the one or more first vibration motors 132 and the one or more second vibration motors 122.

In an embodiment, the massager body 100 further includes a first wiring (not shown), and the first connecting member 140 is provided with a first wiring channel 141 along the length direction of the first connecting member 140. One end of the first wiring is connected to the circuit board 114, and the other end of the first wiring passes through the first wiring channel 141 to connect to the one or more first vibration motors 132. And/or, the massager body 100 further includes a second wiring (not shown), and the second connecting member 150 is provided with a second wiring channel 155 along the length direction of the second connecting member 150. One end of the second wiring is connected to the circuit board 114, and the other end of the second wiring passes through the second wiring channel 155 to connect to the one or more second vibration motors 122.

As shown in FIG. 3 and FIG. 5, in an embodiment of the present application, the massager body 100 further includes a first wiring and a second wiring. The first connecting member 140 is hollow inside to form a first wiring channel 141. The first inserting slot 131*a* and the second inserting slot 131*b* on the mounting member 131 are connected. One end of the first wiring is connected to the circuit board 114, and the other end of the first wiring passes through the first wiring channel 141 from the second connecting part 112 to connect to the one or more first vibration motors 132 on the mounting member 131. The hollow structure of the coil spring is just used for wiring. The second connecting member 150 is provided with a second wiring channel 155 along the length direction of the second connecting member 150. One end of the second wiring passes through the second wiring channel 155 from the first connecting part 111 to connect to the one or more second vibration motors 122 in the second housing 121, so that the battery 116 supplies power to the one or more first vibration motors 132 and the one or more second vibration motors 122.

The above description are only exemplary embodiments of the present application and do not limit the scope of the present application. All equivalent structural changes made by using the contents of the description and drawings of the present application under the technical concept of the present application, or directly/indirectly applied in other related technical fields, are included in the scope of the present application.

What is claimed is:

1. A massager capable of automatically fitting and pressing, comprising:

- a massager body; and
- a flexible rubber sleeve sleeved outside the massager body;

wherein the massager body comprises:

- a handle assembly provided with a first end and a second end opposite to the first end along a length direction of the handle assembly, wherein the first end is provided with a first connecting part and a second connecting part;

a first massage member connected to the first connecting part; and a second massage member connected to the second connecting part through a first connecting member;

wherein the first connecting member is elastic to allow the second massage member to be close to or away from the first massage member, and a distance from an end of the first massage member away from the handle assembly to the second end is greater than a distance from an end of the second massage member away from the handle assembly to the second end;

the first connecting member is elastically deformed under force to make the massager capable of automatically fitting and pressing have a first state and a second state;

in the first state, the second massage member is arranged close to the first massage member, and the first massage member and the second massage member are configured together to massage a first area of a body;

in the second state, the second massage member is arranged away from the first massage member; the first massage member is configured to massage the first area of the body, and the second massage member is configured to massage a second area of the body;

the massager body further comprises a second connecting member; the handle assembly comprises a first housing, and the first connecting part and the second connecting part are provided at one end of the first housing; the first massage member comprises a second housing and one or more second vibration motors provided in the second housing, the one or more second vibration motors are provided in the second housing, and the second connecting member is made of soft rubber; one end of the second connecting member is connected to the first housing, and the other end of the second connecting member is connected to the second housing;

an outer surface of one end of the second connecting member close to the first housing is provided with a first clamping slot; a first inserting hole with a shape matching the second connecting member is formed in the first connecting part, and a first clamping portion is provided to protrude from an inner wall of the first inserting hole corresponding to the first clamping slot;

an outer surface of one end of the second connecting member close to the second housing is provided with a second clamping slot; a second inserting hole with a shape matching the second connecting member is formed on the second housing, and a second clamping portion is provided to protrude from an inner wall of the second inserting hole corresponding to the second clamping slot;

an outer surface of the second connecting member provided in the first inserting hole is provided with a first limiting hole, and a first limiting column is provided to protrude from an inner wall surface of the first inserting hole; the first limiting column is inserted into the first limiting hole, to connect the second connecting member and the first housing in a limiting manner; and an outer surface of the second connecting member provided in the second inserting hole is provided with a second limiting hole; a second limiting column is provided to protrude from an inner wall surface of the second inserting hole, and the second limiting column is inserted into the second limiting hole, to connect the second connecting member and the second housing in a limiting manner.

2. The massager capable of automatically fitting and pressing of claim 1, wherein the first connecting member is an elastic metal member, and the second massage member is in an initial position relative to the first massage member in a natural state; the first connecting member is configured to bend arbitrarily and produce elastic deformation when the second massage member moves, and a rebound force generated by the elastic deformation of the first connecting member is configured to drive the second massage member to return to the initial position.

3. The massager capable of automatic fitting and pressing of claim 2, wherein the second massage member comprises a mounting member and one or more first vibration motors, and the one or more first vibration motors are provided on the mounting member; one end of the first connecting member is connected to the second connecting part of the handle assembly, and the other end of the first connecting member is connected to the mounting member.

4. The massager capable of automatic fitting and pressing of claim 3, wherein the first connecting member is a spring; a first inserting slot is provided at one end of the mounting member, and a second inserting slot is provided at the other end of the mounting member; an end of the first connecting member away from the handle assembly is inserted into the first inserting slot, and the one or more first vibration motors are inserted into the second inserting slot.

5. The massager capable of automatically fitting and pressing of claim 1, wherein the first housing and the second connecting member are an integral structure.

6. The massager capable of automatically fitting and pressing of claim 1, wherein the second housing and the second connecting member are an integral structure.

7. The massager capable of automatically fitting and pressing of claim 1, wherein the second connecting member, the first housing and the second housing are an integral structure.

8. The massager capable of automatic fitting and pressing of claim 1, wherein the handle assembly further comprises a circuit board, a magnetic charging board and a battery; the circuit board, the magnetic charging board and the battery are provided in the first housing, and the battery is electrically connected to the circuit board, the magnetic charging board, the one or more first vibration motors and the one or more second vibration motors.

9. The massager capable of automatically fitting and pressing of claim 8, wherein the massager body further comprises a first wiring, and the first connecting member is provided with a first wiring channel along a length direction of the first connecting member; one end of the first wiring is connected to the circuit board, and the other end of the first wiring passes through the first wiring channel to connect to the one or more first vibration motors.

10. The massager capable of automatically fitting and pressing of claim 9, wherein the massager body further comprises a second wiring, and the second connecting member is provided with a second wiring channel along a length direction of the second connecting member; one end of the second wiring is connected to the circuit board, and the other end of the second wiring passes through the second wiring channel to connect to the one or more second vibration motors.

* * * * *